UNITED STATES PATENT OFFICE 2,233,443

ALLOY AND CUTTING TOOL MADE THEREFROM

William A. Wissler, Niagara Falls, N. Y., assignor to Haynes Stellite Company, a corporation of Indiana No Drawing. Application May 16, 1940, Serial No. 335,503

2 Claims. (Cl. 75—170)

The invention is a new alloy and an edged cutting tool made of such alloy. The alloy and tool of the invention are hard and resistant to abrasion, oxidation, and corrosion. They retain their hardness even at a red heat, and this property is at least partly responsible for its effectiveness when used as an edged tool for cutting such materials as steel and cast iron.

The alloy of the invention contains as essential ingredients tungsten, molybdenum, vanadium, and cobalt. Preferably, it also contains carbon and boron.

More particularly, the alloy comprises from 20% to 40% tungsten, from 5% to 15% molybdenum, from 1% to 6% vanadium, and the remainder cobalt except in those instances in which it contains carbon or boron or both. If carbon is present, it preferably does not exceed 1%; if boron is present, it preferably does not exceed 0.25%. A particularly useful composition approximates 30% tungsten, 10% molybdenum, 3% vanadium, 0.25% carbon, remainder cobalt.

Tests of cutting tools composed of the alloy of the invention, used to cut steel and semi-steel, indicate that such tools are in many respects superior to the standard cobalt-chromium-tungsten tools widely used for this purpose. For instance, when used to cut 0.6% carbon steel at 200 surface feet per minute at constant rates of cut and feed, a tool composed of the alloy of this invention removed forty percent more metal, before needing regrinding, than a standard cobalt-chromium-tungsten tool. On semi-steel, at 300 surface feet per minute, a tool within this invention removed two and one-half times as much metal, before requiring regrinding, than such standard tool.

I claim:
1. An alloy comprising 20% to 40% tungsten, 5% to 15% molybdenum, 1% to 6% vanadium, carbon in a percentage under 1%, remainder substantially all cobalt.
2. An edged cutting tool having approximately the composition: 30% tungsten, 10% molybdenum, 3% vanadium, one-quarter of one percent carbon, remainder cobalt.

WILLIAM A. WISSLER.